United States Patent [19]
Otten

[11] Patent Number: 5,236,154
[45] Date of Patent: Aug. 17, 1993

[54] COVER FOR AIR INTAKE OPENING AT LEADING EDGE OF AIRCRAFT WING

[76] Inventor: Kevin T. Otten, 3015 N. Indiana, Peoria, Ill. 61603

[21] Appl. No.: 737,679

[22] Filed: Jul. 30, 1991

[51] Int. Cl.⁵ .............................................. B64C 1/14
[52] U.S. Cl. ................... 244/129.4; 244/53 B; 244/129.1; 454/76
[58] Field of Search .............. 244/53 B, 129.1, 121, 244/129.4, 118.5; 454/71, 76; 220/327

[56] References Cited

U.S. PATENT DOCUMENTS

| | | | |
|---|---|---|---|
| 1,943,233 | 1/1934 | Beard | 454/76 |
| 2,156,110 | 4/1939 | Brukner | 244/129.4 |
| 2,362,675 | 11/1944 | Stebbins | 244/129.4 |
| 3,000,533 | 9/1961 | Jodock | 244/53 B |
| 4,899,960 | 2/1990 | Hararat-Tehrani | 244/129.4 X |
| 5,014,934 | 5/1991 | McClaflin | 244/129.4 X |

FOREIGN PATENT DOCUMENTS 0121552 6/1946 Australia ..................... 244/129.4

Primary Examiner—Joseph F. Peters, Jr.
Assistant Examiner—Christopher P. Ellis
Attorney, Agent, or Firm—Wood, Phillips, VanSanten, Hoffman & Ertel

[57] ABSTRACT

An improvement in an aircraft of the type having a passenger cabin, a wing with a wall defining a leading edge and having a vent/air intake opening therein and a conduit communicating between the vent/air intake opening and the cabin to provide ventilating air from externally of the aircraft to the cabin. The improvement is an air flow blockage plate that is removably fixed to the wing wall so that in its operative position the air flow blockage plate intercepts and deflects the flow of onrushing air directed towards the vent/air intake opening away from the vent/air intake opening as an incident of the aircraft moving forwardly relative to an air mass.

9 Claims, 2 Drawing Sheets

COVER FOR AIR INTAKE OPENING AT LEADING EDGE OF AIRCRAFT WING

BACKGROUND OF THE INVENTION

1. Field of the Invention

This invention relates to aircraft having systems for directing outside air into a passenger cabin in the fuselage to effect ventilation thereof and, more particularly, to a cover/air flow blockage plate that can be removably placed over a vent/air intake opening in the wing to prevent the incoming of air through the vent/air intake opening to the cabin.

2. Background Art

To provide external air to passengers in small aircraft, it is known to provide a vent/air intake opening in the leading edge of the aircraft wing and to communicate incoming air at the vent/air intake opening through a conduit into the passenger cabin. The following are aircraft that use such a system: Cessna's Model Nos. 140, 150, 152, 170, 172, 180, 182 and 207. These models are only exemplary of aircraft that employ such ventilating systems.

A regulator on the inside of the cabin allows the occupants thereof to select the desired amount of incoming external air. However, the internal regulators for these ventilation systems are normally not made to completely seal off air flow. While this is not a problem in warm weather, when the air is cold, the leakage of cold air into the cabin can make the climate in the cabin uncomfortable.

To avoid the undesired inflow of cold air, it is common for aircraft owners to provide makeshift covers for the vent/air intake opening in the wall at the leading edge of the wing. Typically, the aircraft owner will place one or more pieces of duct tape over the vent to effect sealing thereof. Not only is the tape ineffective in terms of its inability to positively adhere to the wing without affecting the finish thereof, but the tape may also alter the lift characteristics of the wing. The use of duct tape is not approved by the FAA, but to date, for want of a better solution, the tape has been the common solution to the problem of leakage of cold air into the cabin through the conventional ventilation systems.

SUMMARY OF THE INVENTION

The present invention is specifically directed to overcoming the above enumerated problems in a novel and simple manner.

It is a principal objective of the present invention to provide a removable cover/flow blockage plate for the vent/air intake opening at the leading edge of an aircraft wing which can be removably attached to the wing to tightly seal the vent/air intake opening, without damaging the wing or altering the lift characteristics of the aircraft wing.

More specifically the invention contemplates an improvement in an aircraft of the type having a passenger cabin, a wing with a wall defining a leading edge and having a vent/air intake opening therein and a conduit communicating between the vent/air intake opening and the cabin to provide ventilating air from externally of the aircraft to the cabin. The improvement is an air flow blockage plate that is removably fixed to the wing wall so that in its operative position the air flow blockage plate intercepts and deflects the flow of onrushing air directed towards the vent/air intake opening away from the vent/air intake opening as an incident of the aircraft moving forwardly relative to an air mass.

In a preferred form, the leading edge wall has an inside surface and an outside surface with the air flow blockage plate having a surface conforming to the contour of the outside surface of the leading edge wall at the vent/air intake opening. This plate surface can be placed against the outside surface of the leading edge wall to, in most cases, completely cover the vent/air intake opening. Preferably, the air flow blockage plate is a bent piece of metal so that its oppositely facing surfaces both conform to the curvature of the surface at the leading edge of the wing.

To prevent any air leakage, a resilient gasket material can be placed between the air flow blockage plate and outer wing surface at the leading edge thereof. A foam material, for example, is suitable for this purpose.

The invention further contemplates that the air flow blockage plate can be securely fixed onto the wing through an assembly procedure that can take place from in front of the wing without having to access the inside of the wing. A locking plate is used to fix the air flow blockage plate to the wing. The wing wall is captively maintained between the air flow blockage plate and the locking plate, with the latter acting against the inside surface of the leading edge wall.

In one form, a screw, or the like, is used to draw the locking plate and air flow blockage plate, each towards the other, to captively hold the leading edge wall.

In one form of the invention, the vent/air intake opening is at least partially V-shaped and the locking plate has a V-shaped edge. The blockage plate is arranged so that the "V's" open oppositely to, and preferably cross, each other.

To facilitate firm connection of the air flow blockage plate, preferably the blockage plate has Y-shaped configuration with three legs. The vent/air intake opening has a generally triangular configuration defined by three peripheral straight edges. With the air flow blockage plate fixed in its operative position on the wing, the three locking plate legs project one each beyond a peripheral straight edge defining the vent/air intake opening.

The Y-shaped configuration facilitates insertion of the locking plate through the vent/air intake opening from the front of the wing. The locking plate can be tilted to direct the legs thereof separately through the opening and thereafter appropriately oriented. Once the locking plate is in position, the air flow blockage plate and locking plate can be drawn towards each other. Preferably, this is done through a screw directed through the air flow blockage plate and into the locking plate.

The invention contemplates that the air flow blockage plate be attachable without altering the wing or the air flow characteristics at the leading edge of the wing. The invention makes possible an airtight seal at the vent/air intake opening. At the same time, the inventive structure can be readily removed without affecting the surface paint or leaving any residue on the wing.

DETAILED DESCRIPTION OF THE DRAWINGS

Figure 1:
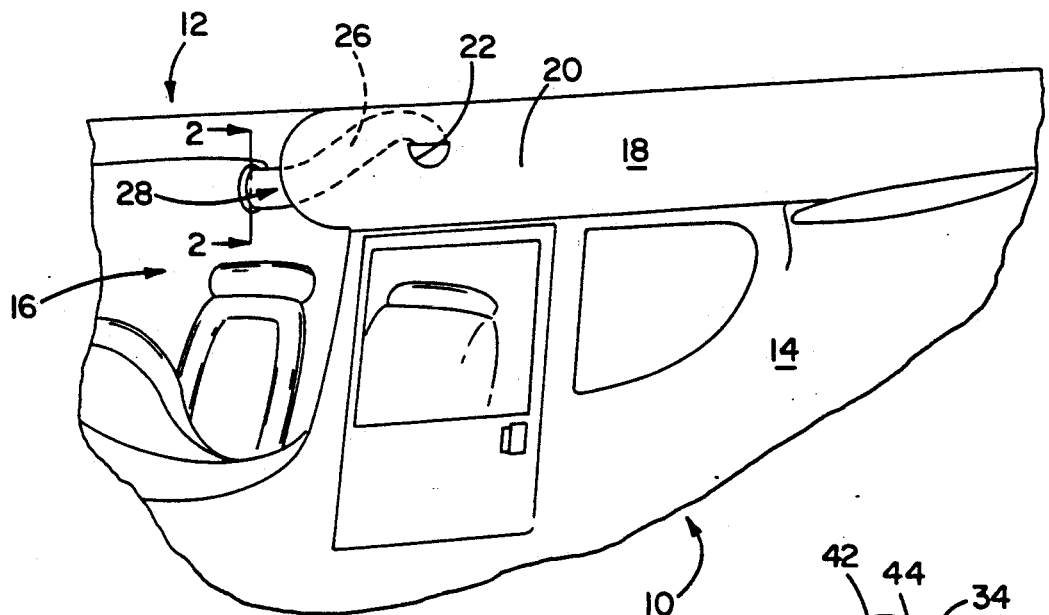
FIG. 1 is a perspective view of a portion of an aircraft showing a passenger cabin and a conventional ventilation system including a vent/air intake opening at the leading edge of the wing.
Figure 3:
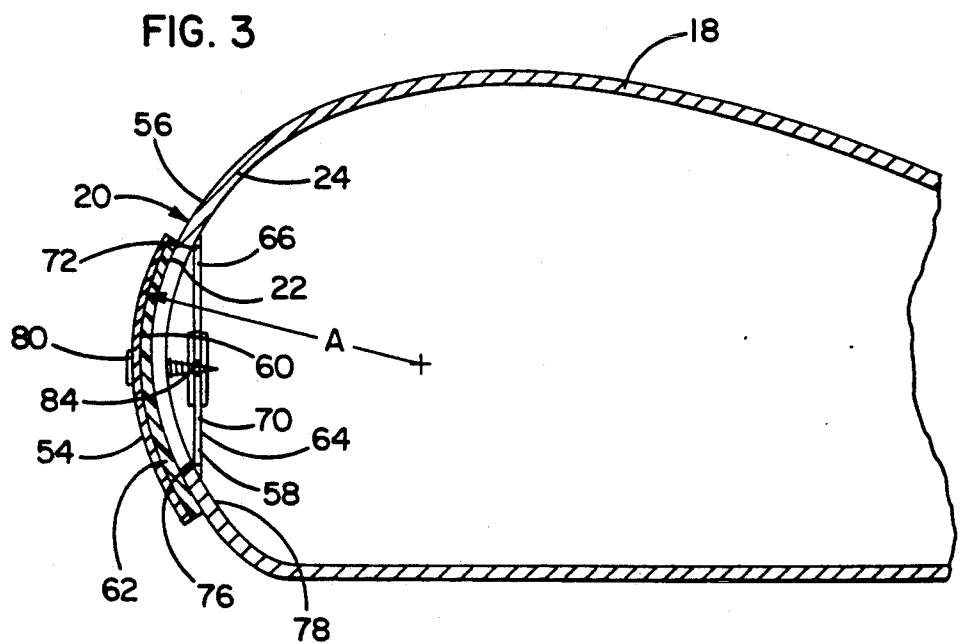
FIG. 3 is an enlarged cross-sectional view of the wing on the aircraft of FIG. 1 and showing the inventive air flow blockage plate fixed in its operative position over the vent/air intake opening at the leading edge of the wing.

In FIG. 1, a conventional aircraft is shown at 10 with a ventilation system at 12 suitable for incorporation of the present invention. The aircraft has a fuselage 14 defining a passenger cabin 16. The aircraft 10 shown has a high wing construction; that is the wings 18 (one shown) are mounted at the top of the fuselage 14. A cross section of one wing 18 is shown in FIG. 3. The wing 18 has a curved leading edge 20 which in part determines the lift characteristics of the wing 18.

It is conventional to provide a vent/air intake opening 22 in the wall 24 defining the wing leading edge 20 as part of the ventilation system 12. The vent/air intake opening 22 has a generally triangular configuration and communicates onrushing air through a normally flexible conduit 26 into the cabin 16. The location of the vent/air intake opening 22 at the leading edge 20 of the wing 18 results in the unimpeded passage of air into the conduit 26 for maximum ventilation benefit. A regulator 28, as seen in FIGS. 1 and 2, controls the amount of air that is admitted into the cabin 16.

More specifically, the regulator 28 consists of a plunger 32 passed through the free open end 32 of the conduit 26. The plunger 32 has a cylindrical body 34 which fits within the conduit 26 and is translatable selectively in and out as indicated by a double-headed arrow 36. A spacing liner 38 of felt, or the like, is fit in a slight annular gap between the outer surface 40 of the plunger body 34 and the inner surface 42 of the conduit 26 to smoothly guide translation of the plunger 32.

Figure 2:
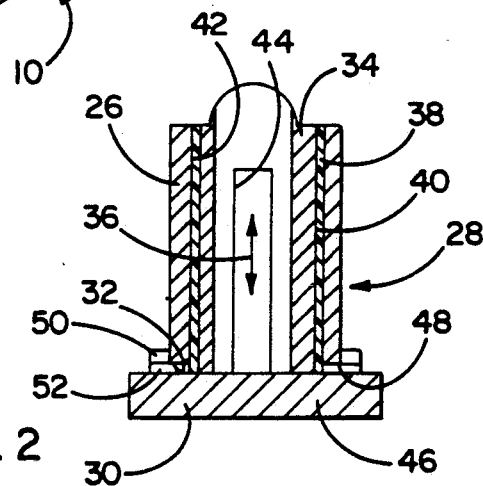
FIG. 2 is a cross-sectional view of a regulator for the ventilation system on the inside of the cabin and taken along line 2—2 of FIG. 1.

The plunger body 34 has an elongate slot 44 therethrough which, with the regulator 28 in the closed position of FIG. 2, resides entirely within the conduit 26. In the closed position for the regulator 28, an enlarged control knob 46 abuts the exposed edge 48 of an outturned flange 50 on the conduit 26. An optional sealing gasket 52 can be interposed between the control knob 46 and flange 50.

To admit outside air into the cabin 16 through the system 12, the user draws the plunger 30 outwardly, which exposes the slot 44 outside of the conduit 26 and thereby defines a communication path between the conduit 26 and the cabin 16. The effective air opening size defined by the slot 44 increases progressively as the plunger 30 is drawn outwardly. With the conventional ventilation system 12, even with the regulator 28 in the closed position of FIG. 2, there is still leakage of air into the cabin 16 due to the significant velocity of air flowing in an unimpeded fashion into the vent/air intake opening 22. It is this problem that the present invention is primarily intended to overcome. That is, the invention contemplates that the ventilation system 12 can be disabled and that the cabin 16 can be positively sealed from air otherwise flowing into the vent/air intake opening 22.

The present invention consists of an air flow blockage plate 54 for situation at the outside surface 56 of the wing wall 24 and a locking plate 58 for situation inside of the wing 18 to fix the air flow blockage plate 54 in its operative position.

The air flow blockage plate 54 is preferably formed from a metal material, and preferably aluminum bent so that the inside surface 60 thereof conforms to the contour of the outside surface 56 at the leading edge 20 of the wing 18. The air flow blockage plate 54 completely covers the vent/air intake opening 22 and is shown to have a conforming shape to minimize the size of the air flow blockage plate 54. A ring of resilient material 62, and preferably foam, is interposed between the inside surface 60 of the air flow blockage plate 54 and the outside surface 56 of the wing wall 24 to maintain an airtight seal at the vent/air intake opening 22.

The invention contemplates that the air flow blockage plate 54 be urged biasably towards the wall surface 56 to compress the resilient material 62 thereagainst, to enhance the air seal, and to firmly fix the air flow blockage plate 54 in its operative position of FIG. 3.

The locking plate 64 is likewise preferably made of metal and has a generally Y-shape with three separate legs 66, 68, 70. The outer edges 72, 74, 76 of the legs 66, 68, 70, consecutively, are arranged to be simultaneously engaged with the inside surface 78 of the wing wall 24. By drawing the air flow blockage plate 54 and locking plate 64, each toward the other, the wing wall 24 is captively maintained therebetween so that the air flow blockage plate 54 is positively held in its operative position of FIG. 3.

To draw the plates 54, 64, towards each other, a screw 80 is employed. The screw 80 is a self-tapping screw that is directed consecutively through a bore 82 in the air flow blockage plate 54, the vent opening 22 and a bore 84 in the locking plate 64. A U-clip 86, of conventional construction, is pressed over the locking plate 64 at the juncture of the legs 66, 68, 70, to make threaded connection with the screw 80 extending through the bore 84.

The configuration of the locking plate 64 is chosen both to facilitate secure engagement of the air flow blockage plate 54 and to facilitate placement of the locking plate 64 internally of the wing 18 through the vent/air intake opening 22. To effect assembly of the air flow blockage plate 54, the screw 80 is directed through the air flow blockage plate 54 and threaded loosely into the clip 86 attached to the locking plate 64. The bore 82 in the plate 54 is sufficiently larger than the diameter of the screw 80 that the plates 54, 64 are relatively movable with the plates 54, 64 preassembled. This allows the locking plate 64 to be canted and one of the longer legs 68, 70 thereof to be first introduced to the vent/air intake opening 22 whereupon the locking plate 64 can be repositioned to permit introduction of the remaining two legs.

Figure 5:
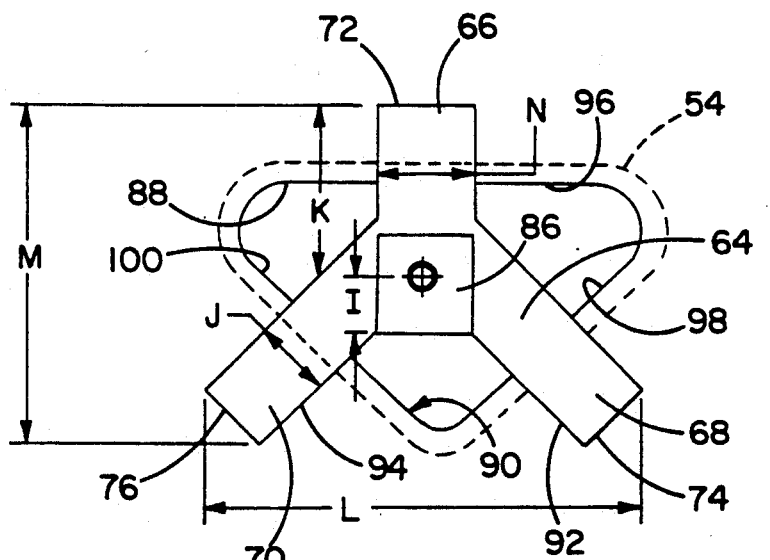
FIG. 5 is a rear elevation view of a locking plate shown in its operative position against an inside surface of the aircraft wing and fixing the air flow blockage plate over the vent/air intake opening.
Figure 6:
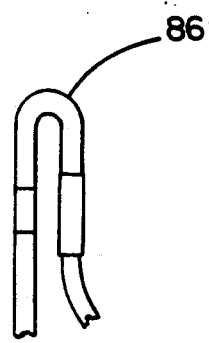
FIG. 6 is a side elevation view of a clip to be snapped on the locking plate to facilitate threading of a screw thereto.

The vent/air intake opening 22 is bounded by a peripheral edge 88 defining an upwardly opening V-shaped edge portion 90. The legs 68, 70 have edges 92, 94 together defining a V-shape which opens oppositely to the edge portion 90. The edges 92, 94 and edge portion 90 cross with the locking plate 64 in its operative position of FIG. 5, to prevent separation of the locking plate from the wing 18.

The Y-shape of the plate 64 is preferred in that it provides three spaced points of contact between the plate 64 and inside surface 78 of the wing wall 24 for stability. As seen clearly in FIG. 5, the peripheral edge 88 consists of three straight edge portions 96, 98, 100 which define a triangular shape. The three edges 72, 74, 76 of the plate 64 project significantly beyond the edge portions 96, 98, 100 with the locking plate 64 operatively oriented to prevent separation of the locking plate 64 from the wing 18. Drawing the screw 80 tight sealingly compresses the resilient material 62 and results in the wing wall 24 being positively held captive between the plates 54, 64.

Removal of the air flow blockage plate 54 is accomplished by loosening the screw 80 and reversing the assembly steps without having to separate the locking plate 64 from the air flow blockage plate 54. Once the air flow blockage plate 54 is removed, the ventilation system 12 can be used in normal fashion.

While the exact configuration and shape of the plates 54, 64 may vary according to the invention, exemplary dimensions are given below for each of the plates.

Figure 4:
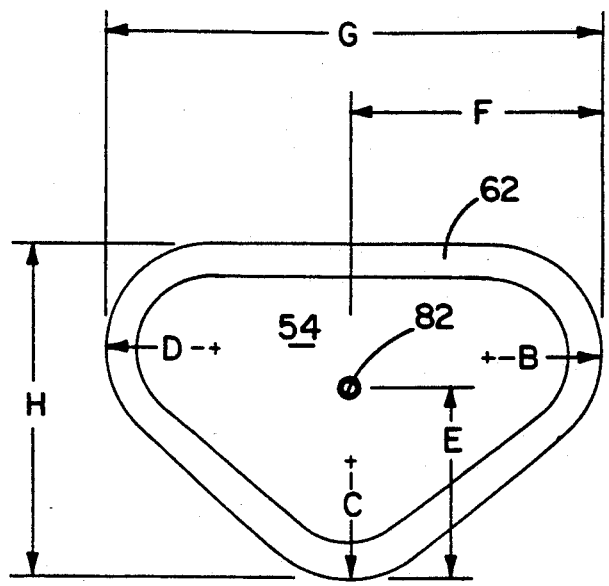
FIG. 4 is a rear elevation view of the air flow blockage plate according to the present invention.

| Air Flow Blockage Plate 54 (FIGS. 3 and 4) | Locking Plate 58 (FIG. 5) |
| --- | --- |
| A = 1⅞ inch | I = ¼ inch |
| B, C, D = ⅜ inch | J = 7/16 inch |
| E = 1 1/16 inch | K = 1 inch |
| F = 1 5/16 inch | L = 2¼ inch |
| G = 2¾ inch | M = 1⅛ inch |
| H = 1¼ inch | N = 9/16 inch |

The foregoing disclosure of specific embodiments is intended to be illustrative of the broad concepts comprehended by the invention.

I claim:

1. In an aircraft having a passenger cabin, a wing with a wall defining a curved leading edge and an inside surface and having an air intake opening therein and a conduit communicating between the air intake opening and the cabin to provide ventilating air to the cabin from externally of the aircraft, the improvement comprising:
    an air flow blockage plate; and
    means for removably fixing the air flow blockage plate to the wing wall in an operative position thereon,
        said blocking plate fixing means comprising a locking plate to engage the inside surface of the wing wall at first and second spaced locations and first means extending through the blockage plate to engage the locking plate and operable from the front of the blockage plate for selectively a) drawing the locking plate and blockage plates towards each other to captively hold the wing wall therebetween in an operative position for the blockage plate and b) allowing the locking plate and blocking plate to be moved away from each other to facilitate placement of the air flow blockage plate on and removal of the air flow blockage plate from the wing,
    said flow blockage plate, in its operative position, having a wall overlying and substantially matched to the curvature of a leading edge of the aircraft wing wall for intercepting and deflecting the flow of air directed towards the air intake opening away from the air intake opening as an incident of the aircraft moving forwardly relative to an air mass.

2. The improved aircraft according to claim 1 wherein the air flow blockage plate completely covers the air intake opening in its operative position.

3. The improved aircraft according to claim 2 including a resilient member captively maintained between the air flow blockage plate and the outside surface of the leading edge wall with the air flow blockage plate in its operative position to thereby substantially obstruct air flow passage through the air intake opening.

4. The improved aircraft according to claim 1 wherein the locking plate is configured to be extendible fully through the air intake opening from the front of the air intake opening to facilitate assembly thereof.

5. The improved aircraft according to claim 1 wherein the air intake opening is defined by an edge that is at least partially V-shaped and the locking plate has a V-shaped edge and with the air flow blockage plate in its operative position over the air intake opening, the V-shaped edges on the air intake opening and locking plate open oppositely to and intersect each other.

6. The improved aircraft according to claim 1 wherein the air intake opening has a generally triangular configuration defined by three straight peripheral edges and the locking plate has a generally Y-shape with three legs, and with the air flow blockage plate fixed in its operative position on the wing, the three locking plate legs project one each across a peripheral straight edge defining the air intake opening.

7. The improved aircraft according to claim 1 wherein the first means comprises a single screw.

8. The improved aircraft according to claim 1 wherein there is a foam material that is compressed between the air flow blockage plate and the outside surface of the leading edge wall with the flow blockage plate fixed in its operative position.

9. The improved aircraft according to claim 1 wherein the flow blockage plate is made from metal.

* * * * *